United States Patent
Tumuluru

(10) Patent No.: US 11,414,613 B2
(45) Date of Patent: Aug. 16, 2022

(54) METHODS OF FORMING DENSIFIED BIOMASS

(71) Applicant: BATTELLE ENERGY ALLIANCE, LLC, Idaho Falls, ID (US)

(72) Inventor: Jaya Shankar Tumuluru, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 356 days.

(21) Appl. No.: 14/324,902

(22) Filed: Jul. 7, 2014

(65) Prior Publication Data
US 2016/0002554 A1  Jan. 7, 2016

(51) Int. Cl.
  C10L 5/44 (2006.01)
  C10L 5/36 (2006.01)

(52) U.S. Cl.
  CPC ............ *C10L 5/44* (2013.01); *C10L 5/363* (2013.01); *C10L 5/445* (2013.01); *Y02E 50/10* (2013.01); *Y02E 50/30* (2013.01)

(58) Field of Classification Search
  CPC . C10L 5/363; C10L 5/44; C10L 5/445; Y02E 50/10; Y02E 50/15
  USPC ................................................ 44/589, 636
  See application file for complete search history.

(56) References Cited

U.S. PATENT DOCUMENTS

| 4,324,561 | A  | * | 4/1982  | Dean ................. B30B 11/201 44/589 |
| 8,647,586 | B2 |   | 2/2014  | Shulenberger et al. |
| 8,669,404 | B2 |   | 3/2014  | Shulenberger et al. |
| 8,673,031 | B2 | * | 3/2014  | Dale ...................... C10L 5/363 44/589 |
| 8,852,301 | B1 | * | 10/2014 | Bootsma ................ C10L 5/143 44/530 |
| 2006/0093718 | A1 | * | 5/2006 | Jurkovich ............. A23K 40/00 426/524 |
| 2006/0130357 | A1 |   | 6/2006 | Long, Jr. |

(Continued)

FOREIGN PATENT DOCUMENTS

WO    WO 2011092503 A1 * 8/2011 ............... C10L 5/14

OTHER PUBLICATIONS

Kenney et al. "Feedstock Supply System Design and Economics for Conversion of Lignocellulosic Biomass to Hydrocarbon Fuels". Idaho National Laboratory Bioenergy Program. Sep. 2013. pp. 1-68.*

(Continued)

*Primary Examiner* — Latosha Hines
(74) *Attorney, Agent, or Firm* — TraskBritt

(57) ABSTRACT

A method includes densifying a biomass feedstock having a moisture content of at least about 30% by weight and drying the biomass feedstock to form a densified biomass having a moisture content of less than about 10% by weight. Some methods include comminuting a biomass feedstock, pressing the biomass feedstock to form a plurality of pellets, heating the plurality of pellets to remove water therefrom, and cooling the plurality of dried pellets. The plurality of pellets exhibits a moisture content of at least about 20% by weight after pressing. The plurality of dried pellets exhibits a moisture content of less than about 10% by weight. A system for forming densified biomass may include a preheater, a press, and a dryer.

30 Claims, 4 Drawing Sheets

(56) References Cited

U.S. PATENT DOCUMENTS

| | | | | |
|---|---|---|---|---|
| 2010/0146850 | A1* | 6/2010 | Bexell | C10L 5/363 |
| | | | | 44/589 |
| 2010/0170105 | A1 | 7/2010 | Burns | |
| 2011/0041390 | A1* | 2/2011 | Flick | C10L 5/363 |
| | | | | 44/589 |
| 2011/0219679 | A1* | 9/2011 | Budarin | C10B 19/00 |
| | | | | 44/605 |
| 2013/0055631 | A1 | 3/2013 | Camper et al. | |
| 2013/0067806 | A1 | 3/2013 | Brock et al. | |
| 2013/0263501 | A1 | 10/2013 | Monroe et al. | |
| 2013/0341569 | A1* | 12/2013 | Ampulski | C10J 3/485 |
| | | | | 252/373 |
| 2014/0082998 | A1 | 3/2014 | Brock et al. | |

OTHER PUBLICATIONS

Karunanithy "Effect of Extruder Parameters and Moisture Content of Switchgrass, Prairie Cord Grass on Sugar Recovery from Enzymatic Hydrolysis" Apr. 2010 (Year: 2010).*

Tumuluru "Effect of process variables on the density and durability of the pellets made from high moisture corn stover" Feb. 2014 (Year: 2014).*

Tumuluru et al. "A Technical Review on Biomass Processing: Densification, Preprocessing, Modeling and Optimization" Jun. 2010 (Year: 2010).*

Karunanithyetal."Effect of Extruder Parameters and Moisture Content of Switchgrass, Prairie Cord Grass on Sugar Recovery from Enzymatic Hydrolysis" Apr. 2010 (Year: 2010).*

Hoover et al., "Effect of Pelleting Process Variables on Physical Properties and Sugar Yields of Ammonia Fiber Expansion Pretreated Corn Stover", Bioresource Technology 164 (2014) pp. 128-135.

Ray et al., "Effect of Pelleting on the Recalcitrance and Bioconversion of Dilute-Acid Pretreated Corn Stover", © Battelle Energy Alliance, LLC, 2012, pp. 1-42.

Sarkar et al. "Gasification Performance of Switchgrass Pretreated with Torrefaction and Densification", Applied Energy 127 (2014) pp. 194-201.

Sarkar et al. "Thermal Devolatilization Kinetics of Switchgrass Pretreate with Torrefaction and Densification", © 2014 American Society of Agricultural and Biological Engineers, vol. 57(1), pp. 1-12.

Shankar et al. "Process Variables During Single-Screw Extrusion of Fish and Rice-Flour Blends", Agriculturual and Food Engineering Department Indian Institute of Technology, May 1, 2005, pp. 151-164.

Tumuluru et al. "A Review on Biomass Densification Technologies for Energy Application", Idaho National Laboratory, Aug. 2010, 96 pages.

Tumuluru et al. "A Review on Biomass Torrefaction Process and Product Properties for Energy Applications", Industrial Biotechnology, Oct. 2011, pp. 384-402.

Tumuluru "Effect of Process Variables on the Density and Durability of the Pellets Made from High Moisture Corn Stover", Biosystems Engineering 119 (2014), pp. 44-57.

California Pellet Mill, Model 7900 Wood Pellet Mill, https://www.cpm.neVdownloads/Wood%20Pelleting%20Process.pdf, retrieved from web on Oct. 3, 2017, 2 pages.

Izli, Effect of Moisture on the Physical Properties of Three Varieties of Kenaf Seeds, J. Food Sci Technol, Jun. 2015, vol. 52(6), pp. 3254-3263, Association of Food Scientists & Technologists, India.

Lam et al., "Bulk Density of Wet and Dry Wheat Straw and Switchgrass Particles," American Society of Agricultural and Biological Engineers, vol. 24(3): pp. 351-358, 2008.

Lamers et al., Techno-economic analysis of decentralized biomass processing depots, Bioresource Technology 194, pp. 205-213, 2015.

Oginni et al., Physical and Flow Properties of Fractionated Loblolly Pine Grinds, 2016, American Society of Agricultural and Biological Engineers, vol. 59(5), pp. 999-1008.

Tumuluru, High moisture corn stover pelleting in a flat die pellet mill fitted with a 6 mm die: physical properties and specific energy consumption, Energy Science & Engineering 2015, 3(4), pp. 327-341, 2015.

Tumuluri et al., "Method to Produce Durable Pellets at Lower Energy Consumption Using High Moisture Corn Stover and a Corn Starch Binder in a Flat Die Pellet Mill," Journal of Visual Experiments, Jun. 2016, 13 pages.

Tumuluru, Specific energy consumption and quality of wood pellets produced using high-moisture lodgepole pine grind in a flat die pellet mill, Chemical Engineering Research and Design 110, pp. 82-97, 2016.

Tumuluru, "Low Temperature Drying Studies on High Moisture Woody and Herbaceous Biomass Pellets", 2018 ASABE Technical Presentation, Session 353—Drying, Handling and Storage—Part 3, Aug. 1, 2018, "Thin layer drying characteristics of high moisture woody and herbaceous biomass pellets in a laboratory scale grain dryer", Paper No. 1800744, Detroit, MI, 15 pages.

Tumuluru, "Pelleting of Pine and Switchgrass Blends: Effect of Process Variables and Blend Ratio on the Pellet Quality and Energy Consumption", Energies 12, 1198 (2019) 26 pages.

Tumuluru, "Effect of pellet die diameter on density and durability of pellets made from high moisture woody and herbaceous biomass", Carbon Resources Conversion, 1 (2018) pp. 44-54.

Tumuluru, "1.2.1.2 Biomass Engineering: Size reduction, drying and densification of high moisture biomass, Technology Area Session: Feedstock Supply & Logistics", U.S. Department of Energy (DOE) Bioenergy Technologies Office (BETO), 2017 Project Peer Review, eere.energy.gov, (Mar. 2017) 34 pages.

* cited by examiner

METHODS OF FORMING DENSIFIED BIOMASS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the present disclosure relate generally to the processing and densification of biomass to form cohesive solids, such as pellets, briquettes, cubes, disks, sheets, spheres, etc. More specifically, embodiments relate to processing and densification of biomass requiring reduced energy input.

BACKGROUND

Solid fuels are used for generating electric power and in metallurgic and cement manufacturing processes. This market is dominated by non-renewable resources, principally coal, and to a lesser extent petroleum coke. Biomass sources, which are generally considered to be renewable, typically supply only a small fraction of the solid fuels market.

Biomass is biological material derived generally from plants. Biomass includes wood (e.g., dead trees, branches, and tree stumps), yard clippings, wood chips, remains of crops after harvesting, etc. There is an opportunity to replace fossil fuels like petroleum and coal-based products with bio-based products and biofuels from biomass. In general, agricultural and forestry biomass can be used to generate electricity, supply heat and steam power, and heat homes. Various plants can be used to supply biomass for fuels, such as miscanthus, switchgrass, hemp, corn, poplar, willow, sorghum, sugarcane, bamboo, and a variety of tree species.

There is a need to switch to energy sources that will have less of an adverse environmental impact, such as lower emissions of greenhouse gases. Biomass sources are an attractive alternative to conventional solid fuels, but high transportation costs and low energy density of the biomass materials have hindered their widespread use.

Biomass in its natural form is bulky, loose, and dispersed. Bales of biomass typically have densities from about 40 kg/m³ to about 200 kg/m³, and are difficult to transport, store, and handle. Furthermore, direct combustion of loose biomass has low thermal efficiency.

Densification processes may be used to enhance the efficiency and economics of biomass as an energy source, such as by decreasing transportation and storage costs, increasing uniformity of feed material, increasing energy density, and increasing safety (e.g., by reducing the risk of fire during storage). FIG. 1 illustrates a simplified process flow diagram of a typical commercial pelletization process 1. The process 1 includes harvesting 10 of a biomass (e.g., cutting and baling), comminuting 20 (e.g., chopping, milling, etc.), drying 30 (typically in a rotary dryer) to approximately 10% moisture by weight, steam conditioning 40, densification 50, cooling 60, transport 70, and storage 80. Densification 50 may include the use of pellet mills, cubers, briquette presses, screw extruders, roller presses, tablet presses, and/or agglomerators. The process 1 of converting biomass into usable uniform densified material is energy intensive, largely due to the drying 30 operation before the densification 50.

There is a need in the art for methods to increase the efficiency of forming biomass into a form usable as a solid fuel. Such methods may produce a fuel that is compatible with equipment currently in use for burning conventional solid fuels.

BRIEF SUMMARY

In some embodiments, a method of forming densified biomass includes densifying a biomass feedstock having a moisture content of at least about 30% by weight to fault a first densified biomass and drying the first densified biomass to form a second densified biomass having a moisture content of less than about 10% by weight.

In other embodiments, a method of forming densified biomass includes comminuting a biomass feedstock, pressing the biomass feedstock to form a plurality of pellets, heating the pellets to remove water therefrom, and cooling the dried pellets. The pellets exhibit a moisture content of at least about 20% by weight after pressing. The dried pellets exhibit a moisture content of less than about 10% by weight.

In some embodiments, a system for forming densified biomass includes a preheater, a press, and a dryer. The preheater is configured to heat a flow of comminuted biomass to a temperature within a range from about 70° C. to about 110° C. and form a preheated biomass having a moisture content of at least about 30% by weight. The press is configured to densify the preheated biomass to form a densified biomass having a moisture content of at least about 20% by weight. The dryer is configured to heat the densified biomass to a temperature between about 50° C. and about 100° C. to form a dried densified biomass having a moisture content of less than about 10% by weight.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not actual views of any particular equipment, device, or process, but are merely idealized representations that are employed to describe example embodiments of the present disclosure. Additionally, elements common between figures may retain the same numerical designation.

Figure 1:
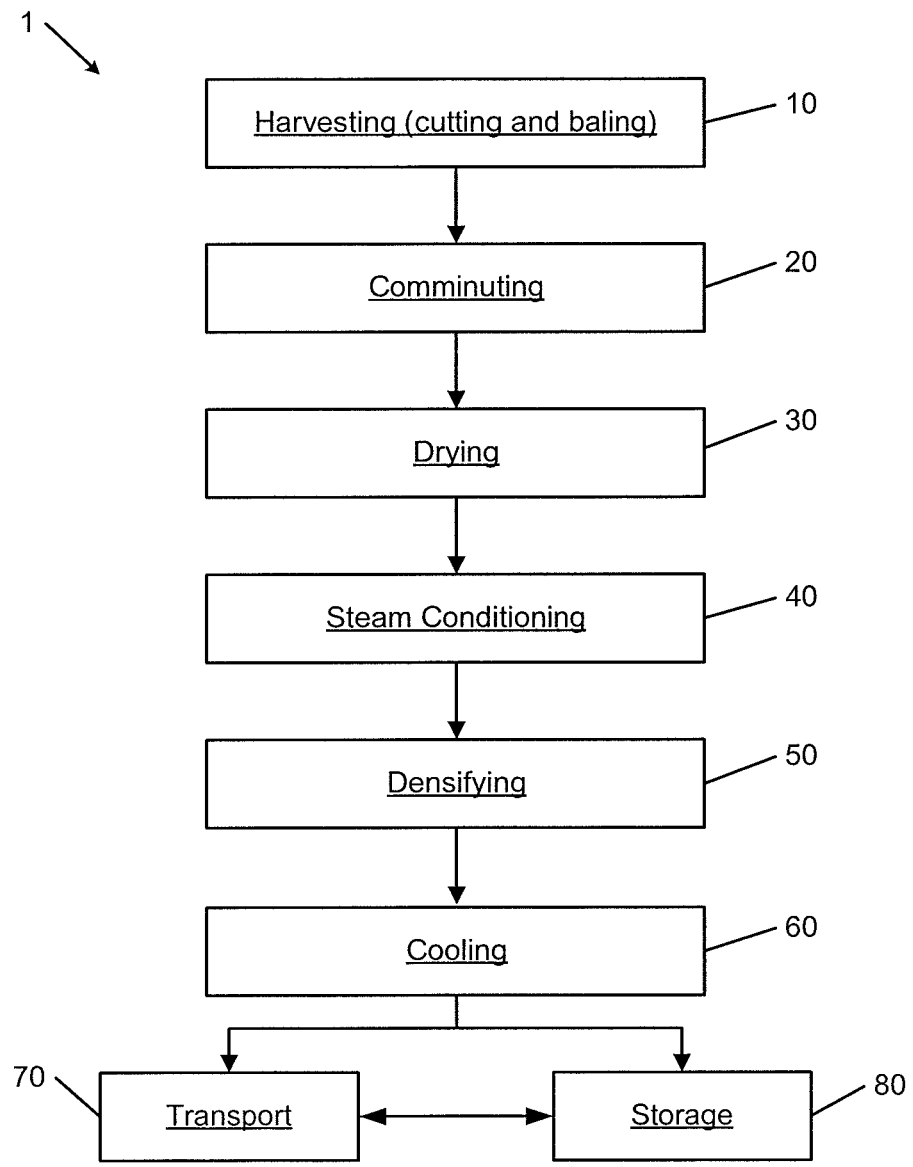
FIG. 1 is a simplified process flow diagram showing a conventional biomass pelletizing process.
Figure 2:
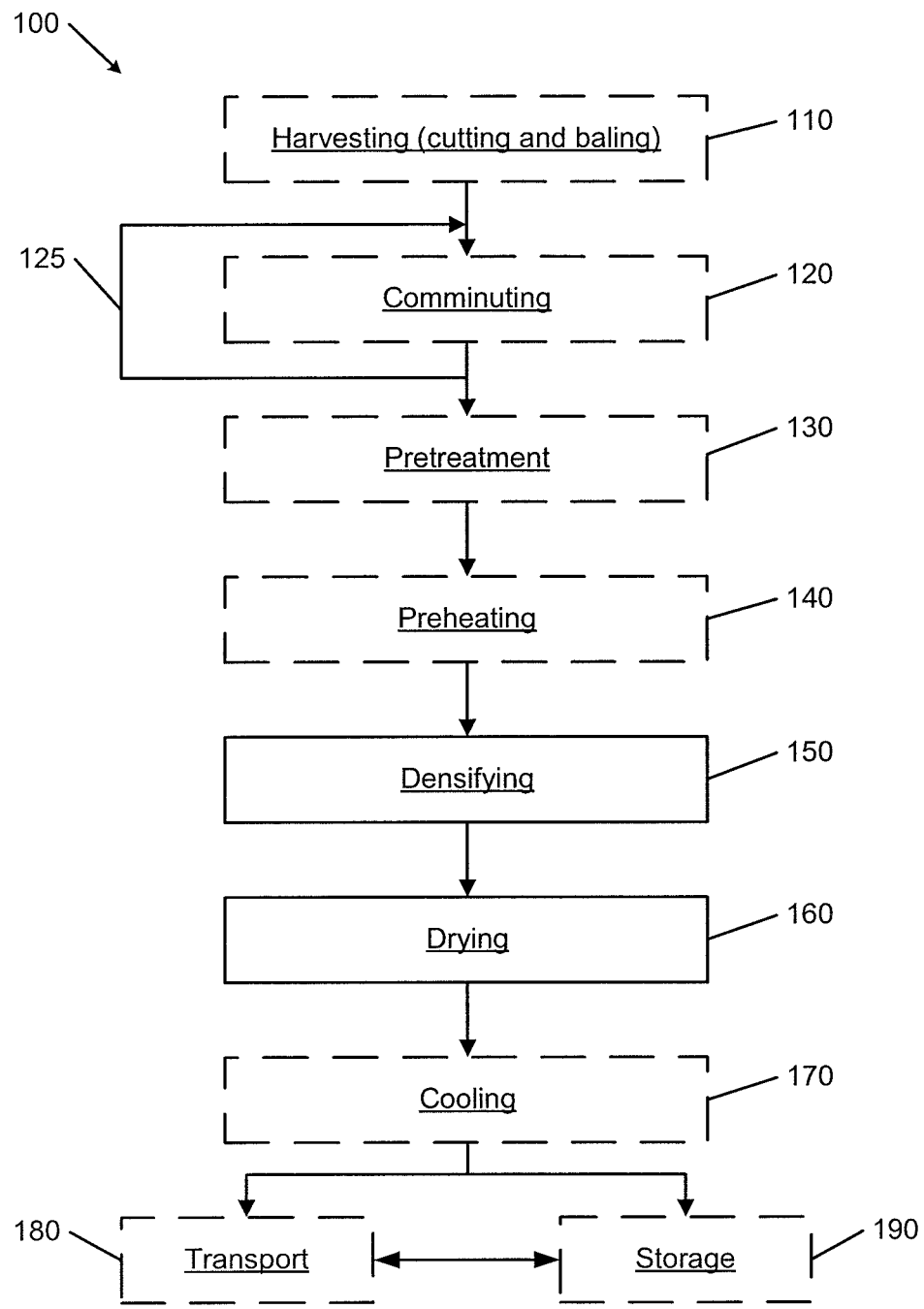
FIG. 2 is a simplified process flow diagram showing a biomass densification process according to the present disclosure.

A method 100 of forming a densified biomass according to embodiments of the disclosure is illustrated as a simplified process-flow diagram in FIG. 2. The illustrated method 100 is nonlimiting and includes optional process acts, as described in more detail below. Some process acts may be omitted, depending on feedstocks available and outputs required. The method 100 may include one or more of harvesting 110 a biomass, comminuting 120 the biomass, pretreatment 130, preheating 140, densification 150, drying 160, cooling 170, transport 180, and storage 190. Implementation of embodiments of the disclosure may be characterized as "high moisture" processes because the material entering the densification act exhibits higher moisture content than conventional processes.

As used herein, the term "biomass" means and includes organic nonfossil biological material derived from living or recently living plants. Biomass includes lignocellulosic biomass, which is composed of carbohydrate polymers (e.g., cellulose, hemicellulose) and an aromatic polymer (lignin). Lignocellulosic biomass can be broadly classified as herbaceous or woody. Herbaceous biomass includes, for example, corn stover (*Zea mays* L.), wheat straw, energy sorghum, miscanthus, and switch grass. Woody biomass includes, for example, pine, eucalyptus, hybrid poplar, and oak. Formulated feedstocks can include a combination of woody and herbaceous biomass (e.g., 50% woody biomass and 50% herbaceous biomass). Biomass may also include municipal solid waste. Biomass may be produced for the specific purpose of producing energy (e.g., through the processes disclosed herein) or may be the byproduct of other activities (e.g., food production). Some biomass may be used as animal feed.

As used herein, the term "pellet" means and includes a cohesive mass of solid fuel. Pellets can be generally cylindrical or prismatic (e.g., cubic) in shape, or may have any other appropriate shape. For example, pellets may be shaped as briquettes, having two intersecting generally curved outer surfaces. Pellets may also be agglomerations of solid fuel, wherein the agglomerations have various shapes, even irregular shapes.

Harvesting 110 biomass may include a variety of process acts, such as cutting and baling of biomass. If the biomass is a part of a food crop (e.g., corn, wheat, rice, sugar cane, etc.), the portion suitable as food may be harvested, and the waste may be separated for use in the method 100 depicted. For example, corn kernels may be harvested for human or animal use, and the stalks, leaves, husks, and/or cobs may be separated and baled. The biomass may be at least partially dried (e.g., by remaining cut in the field before baling), and may be transported as necessary for subsequent processing. In some embodiments, subsequent processing may be performed in close proximity to the biomass source, such that baling is unnecessary. In other embodiments, baled biomass may be purchased from one or more suppliers.

Baled or unbaled biomass may be comminuted 120 to an appropriate size. For example, the biomass may be cut, sheared, ground, clipped, and/or screened, such that the biomass passed to subsequent processes is in the form of particles small enough and/or uniform enough to be efficiently handled. For example, the biomass may be comminuted and screened to ensure that each particle passing to subsequent processing has a minimum linear dimension (e.g., a width, a diameter, etc.) of less than about $3/16$ inch (4.7 mm), and materials larger than this may be screened out. The screened out biomass may optionally be recycled 125 through the comminuting 120 process until the biomass breaks down to a size that can pass through the screen. In some embodiments, the screened out biomass may be removed from the process and discarded, or may be used in another process.

In some embodiments, the biomass may be subjected to one or more pretreatments 130. The pretreatment 130 may include, for example, the addition of a binder material to the biomass to reduce the energy required during densification 150 or to improve durability of densified biomass. Binders can include starches (e.g., commercial corn starch), molasses, lignosulfonates (e.g., ammonium lignosulfonate, calcium-magnesium lignosulfonate, etc.), proteins, lipids, fats, colloidal minerals (e.g., bentonite), etc. The pretreatment 130 may include the addition of water to bring the moisture content within a selected range. For example, water may be added to raise the moisture content of the biomass to at least 25% by weight, at least 28% by weight, at least 30% by weight, or even at least 33% by weight. In some embodiments, the biomass may be pretreated 130 with ammonia in an ammonia fiber expansion process (which may also be referred to in the art as "ammonia fiber explosion"), such as described in U.S. Pat. No. 8,673,031, issued Mar. 18, 2014, and titled "Pretreated Densified Biomass Products," the entire disclosure of which is incorporated herein by this reference. For example, ammonia may be used to solubilize lignin from in between cell walls of the biomass, and redeposit the lignin near the surface of the biomass. The pretreatment 130 may include any combination of these methods, or may include other pretreatment methods known or subsequently developed. Though shown as following the comminution 120, pretreatment 130 may alternatively be performed before comminution 120 or between cycles of comminution 120. In some embodiments, pretreatment 130 may be performed before and after comminution 120. For example, pretreatment 130 with ammonia or water may be performed before comminution 120, and pretreatment with a binder may be performed after comminution 120.

After the comminution 120 and pretreatment 130, if any, the biomass may be preheated 140 before the densification 150. The preheating 140 may include heating the biomass to a temperature in a range from about 70° C. to about 110° C. and maintaining a target temperature for a period of about five (5) minutes or less. Such conditions may impart energy to the biomass without substantially reducing the moisture content of the biomass and without causing torrefaction of the biomass. Torrefaction is a slow pyrolysis process in which water and volatile compounds are released from the biomass, and which generally occurs at temperatures from about 200° C. to about 350° C. over a time period of about 30 minutes or more. Torrefaction typically causes biomass to have a moisture content of about 10% by weight or lower. Though torrefaction is known to have certain benefits in the processing of biomass, and though torrefaction may be used at other points in the densification process, avoiding conditions in the preheating 140 at which torrefaction occurs helps maintain the moisture level of the biomass. Though preheating 140 may be performed on any biomass, preheating 140 appears to be most beneficial for biomass having a moisture content of greater than about 33% by weight. Without being bound to any particular theory, it appears that preheating 140 assists in compaction and in partial drying of the biomass during densification 150, possibly by activating biomass components such as lignin, starch, etc.

After the preheating 140, if any, the biomass may be densified 150. The biomass may exhibit a moisture content before densification of at least 25% by weight, at least 28% by weight, at least 30% by weight, or even at least 33% by weight. During the densification 150, the biomass may be subjected to high pressure, such as in a pellet mill, a briquette press, an agglomerator, a cuber, or an extruder. For example, the biomass may be subjected to a pressure from about 10 MPa to about 600 MPa, such as from about 50 MPa to about 100 MPa, or from about 100 MPa to about 500 MPa. The high pressure may be used to compress and/or compact the biomass into a cohesive, densified biomass. Due to the applied pressure on the biomass, the temperature of the biomass may increase during densification 150. For example, a pellet die temperature may reach a temperature from about 100° C. to about 110° C. Without being bound to any particular theory, the increased temperature may tend to promote evaporation of some of the water within the biomass. Thus, as the pressure is released, the moisture content of the densified biomass may decrease based on the amount of water escaping from the biomass. For example, the moisture content of the densified biomass may be from about 8% to about 10% by weight lower than the moisture content of the biomass before densification 150. The decrease in the moisture content may be attributed to pre-heating temperature (if applicable), frictional heat developed during densification 150, and cooling, which may cause the densified biomass to lose surface moisture due to flash-evaporation after pressure is released.

The densification 150 may be performed using various types of conventional equipment, such as a pellet mill. For example, the biomass may be pressed through a die hole (i.e., an orifice) having a diameter from about 5 mm to about 10 mm, forming cylindrical pellets having a diameter approximately equal to about the diameter of the die hole. In some embodiments, cylindrical pellets may be produced having a diameter of about 6 mm or about 8 mm. Pellets may be formed continuously, and optionally be cut upon reaching a selected length. For example, pellets may be cut when the pellets exhibit a length from about one to about five times an average diameter of the pellets. Thus, if the pellets have a diameter of about 6 mm, the pellets may have a length from about 6 mm to about 30 mm. In some embodiments, the pellets may not be cut to any particular length, but may remain continuous or may naturally break into discrete volumes during or after pressing. Pellets may also be formed having any other selected shape, such as having a triangular cross-section, a square cross-section, a hexagonal cross-section, etc. Such pellets may be formed by passing the biomass through a correspondingly shaped die hole (e.g., an orifice having a maximum dimension in a range from about 6 mm to about 8 mm). In some embodiments, pellets may be formed by passing the biomass between adjacent rollers of a briquette press. The rollers may have indentations corresponding to the shape of the exterior surface of pellets to be formed. As the biomass is pressed by the rollers, the biomass forms cohesive pellets (e.g., briquettes) of the biomass. In some embodiments, the biomass is pressed, then cut into pellets such as discrete cubes.

The densified biomass may be dried 160 after densification 150. For example, the densified biomass may be exposed to heated and/or dried air to remove additional water. The densified biomass may be dried until a selected moisture content is reached. In some embodiments, the densified biomass may be dried to a moisture content of less than 20% by weight, such as a moisture content of less than 15% by weight or less than 10% by weight. For example, the densified biomass may be dried until it has a moisture content from about 7.0% by weight to about 9.0% by weight. The drying conditions may vary based on process parameter, such as reactor design (e.g., batch or continuous), mass flow rates, available utilities, etc. The densified biomass may also be passed through a continuous drying process. In some embodiments, waste heat from other processes (e.g., tractor exhaust, burning of fines or oversize biomass, etc.) may be used to provide some or all of the heat to dry the densified biomass.

The densified biomass may be dried in grain dryers, belt dryers, or cross-flow dryers, which typically operate at relatively lower temperatures and with lower operating costs than dryers used in conventional processes. For example, grain dryers are described in U.S. Patent Application Publication No. 2010/0170105, published Jul. 8, 2010, and titled "Grain Dryer"; and U.S. Patent Application Publication No. 2006/0130357, published Jun. 22, 2006, and titled "Continuous Horizontal Grain Drying System"; the entire disclosures of each of which are incorporated herein by this reference. Conventional processes typically dry biomass before pelletizing, such as in rotary kiln dryers. Such dryers require higher temperatures than grain dryers, and also require continuously moving the material within the dryer. In the present process, pelletized biomass may be dried in a vessel maintained at a temperature of at least 60° C. with circulating fresh dry air for a time period from about two (2) hours to about three (3) hours. In some embodiments, the densified biomass may be dried in a cross-flow process, and heat may be reclaimed. The drying of densified biomass may require 40% to 60% less energy than drying uncompressed biomass. Without being bound to any particular theory, it appears that loss of moisture during densification 150 (e.g., to less than about 25% by weight) allows the lower-temperature drying 150 of densified biomass, whereas higher temperatures may be required to begin the drying process when material has a higher moisture content (e.g., above 30% by weight). In some embodiments, the drying process may be performed at temperatures between about 50° C. and about 100° C., such as between about 60° C. and about 90° C., or between about 70° C. and about 80° C. Drying densified biomass in a grain dryer, belt dryer, or cross-flow dryer may provide more uniform temperature distributions and thus may produce a more uniform product. Furthermore, such dryers may have lower particulate emissions, lower volatile organic carbon (VOC) emissions, lower fire hazards, and a lower footprint than dryers used in conventional densification processes.

After drying 160, the dried densified biomass may exhibit a density from about 400 kg/m$^3$ to about 650 kg/m$^3$, such as from about 500 kg/m$^3$ to about 600 kg/m$^3$. Though the density of the dried densified biomass may be lower than the density of conventional biomass pellets, densified biomass formed as disclosed herein may still have significantly higher density than raw biomass. Densified biomass formed as disclosed herein may be relatively more porous and relatively more susceptible to enzymatic hydrolysis than conventional biomass pellets. Thus, densified biomass formed as disclosed may burn more uniformly and be relatively easier to transport and process than conventional biomass pellets. Furthermore, densified biomass may have higher ethanol or xylose (wood sugar) yields in hydrolysis processes (e.g., after treatment with a dilute acid) than conventional materials, which may make energy production cheaper or more efficient.

The dried, densified biomass may be cooled 170 to ambient temperature after a selected moisture content is reached. The cooled material may be transported 180 and/or stored 190 for use or sale. As shown in FIG. 2, the transport 180 and storage 190 may occur in any order and for any number of times. For example, the cooled material may be stored locally for a period of time, then transported elsewhere and stored again. In some embodiments, the dried densified biomass may be used at the same location as produced, and thus, cooling, transport, and/or storage may be limited or omitted.

High-moisture pelletization according to embodiments of the disclosure can produce hard and durable pellets from a feedstock having moisture contents of up to about 35% by weight. These processes offer advantages over conventional processes for drying and densifying biomass. For example, high-moisture pelletization consumes less energy than conventional processes because pellets can be dried at lower temperatures, and because steam-conditioning can be eliminated. In addition, VOC emissions are lower than in conventional processes, which is beneficial for environmental and safety reasons. Furthermore, the elimination of equipment such as rotary dryers and steam conditioners has the potential to save capital and operating costs by enabling the use of simpler, lower-energy drying equipment such as, for example and without limitation, grain or belt dryers.

In some embodiments, high-moisture pelletization processes according to embodiments can be used to pelletize biomass in the field. In other words, such processes may be implemented at, or immediately adjacent to, a biomass source. Thus, instead of baling and transporting bales (having densities from about 40 kg/m$^3$ to about 200 kg/m$^3$), higher-density pellets (having densities from about 400 kg/m$^3$ to about 650 kg/m$^3$) can be formed on-site and then transported. This approach can save costs of transportation of undensified biomass and pre-processing storage of same.

In other embodiments, raw biomass can be baled and transported to nearby depots, where the biomass can be comminuted and densified in a high-moisture pelletization process. The densified material can then be transported to the point of use. As noted previously, the raw biomass need not be dried or steam-conditioned before processing.

High-moisture pelletization according to embodiments of the disclosure can also be used to make pellets for use as animal feed, and similar benefits may be realized over conventional feed processing methods.

Figure 3:
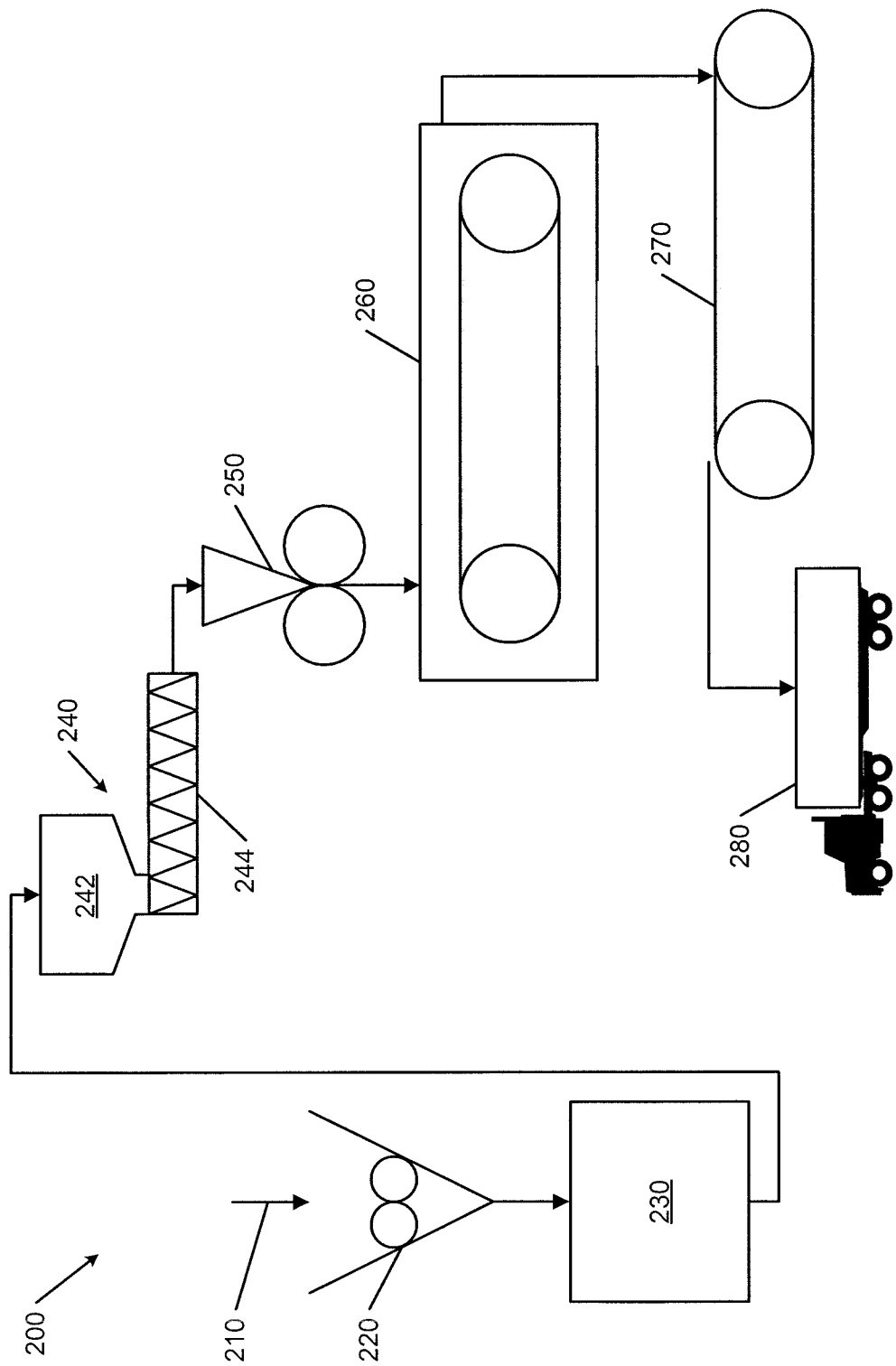
FIG. 3 is a simplified schematic diagram illustrating a system for forming densified biomass according to the present disclosure.

A system for forming densified biomass may include unit operations structured and configured to perform the functions described herein. For example, FIG. 3 illustrates a nonlimiting example of a system 200 having a mill 220, a preprocessor 230, a preheater 240, a press 250, a heater 260, and cooler 270. Harvested biomass 210 enters the mill 220, wherein the biomass 210 is chopped, crushed, or otherwise comminuted. The biomass 210 may be treated with ammonia, a binder material, additional water, or some other material or process in the preprocessor 230. The biomass 210 may be preheated in the preheater 240, which may include a feed hopper 242 and a heat exchanger 244. The heat exchanger 244 may be configured to receive heat from a heat-transfer fluid (e.g., steam, oil, etc.). The biomass 210 may be densified in the press 250, which may be, for example, a pellet mill, a tuber, a briquette press, a screw extruder, etc. The biomass 210 may be dried in the dryer 260, which may comprise a grain dryer, a heated conveyor belt, etc. After drying, the biomass 210 may be cooled in or on a cooler 270, such as on a conveyor belt, a silo, etc. The biomass 210 may be transported via truck 280 or any other appropriate means after densification.

Figure 4:
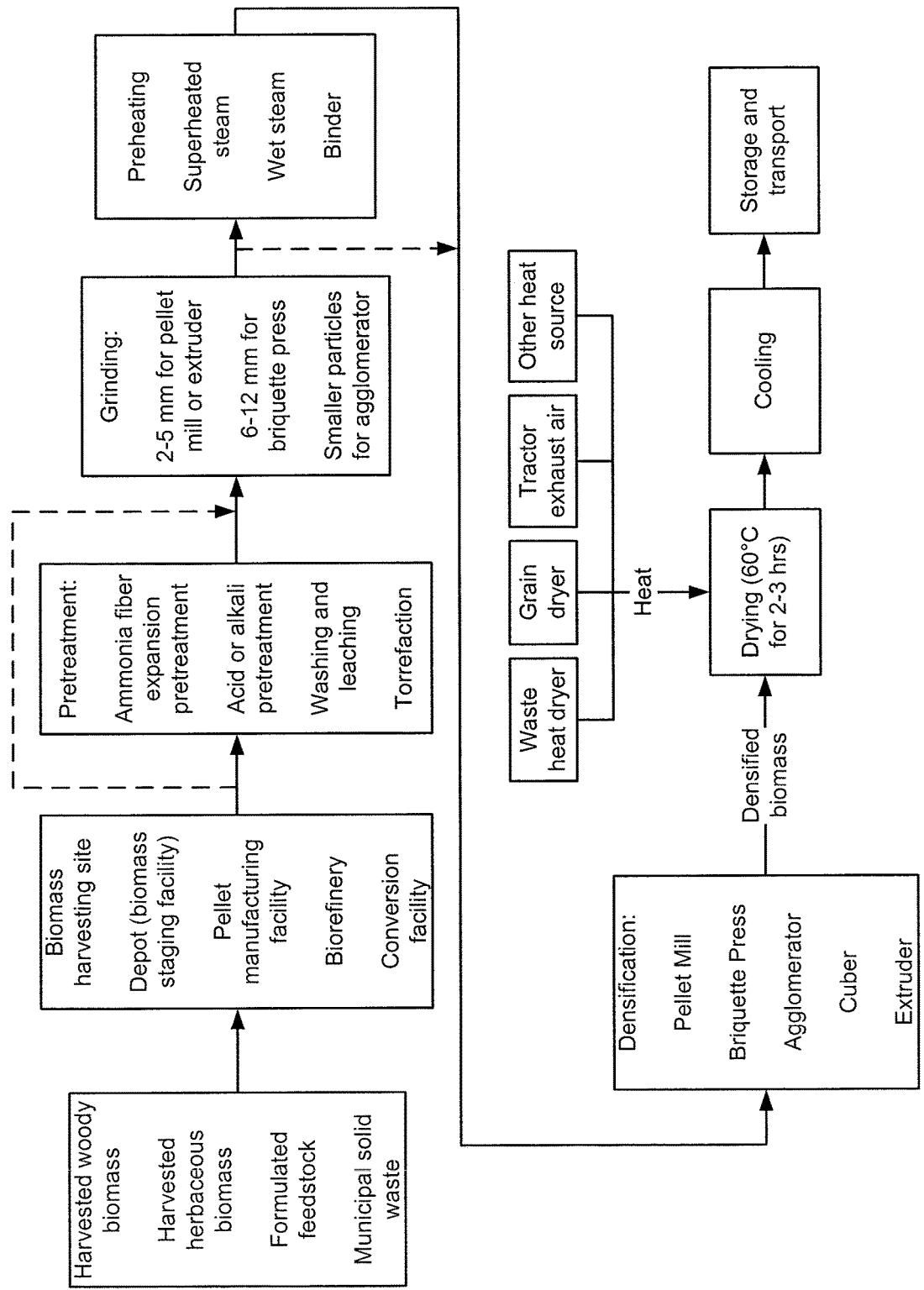
FIG. 4 is a simplified process flow diagram showing a variety of nonlimiting alternative embodiments of how materials may be densified according to the present disclosure.

FIG. 4 is a simplified process flow diagram showing a variety of nonlimiting alternative embodiments of how materials may be treated. A biomass feedstock, such as a harvested woody biomass, a harvested herbaceous biomass, a formulated feedstock (i.e., a mixture of woody and herbaceous biomass), or municipal solid waste, may be produced at or near, or transported to a harvesting site, a depot, a pellet manufacturing facility, a biorefinery, or a conversion facility. The biomass may or may not be subjected to a pretreatment process, such as ammonia fiber expansion, alkali pretreatment, washing and leaching, or torrefaction before grinding to a selected particle size. Some pretreatment processes may make the biomass more easily densifiable and may leave the biomass with a relatively higher moisture content than the raw biomass feedstock. The selected particle size may depend on the type of densification process to be used. For example, biomass may be ground to a maximum dimension from about 2-5 mm for densification in a pellet mill or extruder, or a maximum dimension from about 6-12 mm for densification in a briquette press. Small particles may be formed for densification in an agglomerator. After grinding, the biomass may be preheated and moisture and/or a binder may be added. For example, the biomass may be preheated to a temperature from about 30° C. to about 110° C. for 2-3 minutes. Wet steam (i.e., saturated steam) may be added to both heat and add moisture content to the biomass. Dry steam (i.e., superheated steam) may be added to heat the biomass without adding moisture. One or more binders (e.g., commercially available pellet binders, starch, or other natural or artificial binders) may optionally be added to reduce the specific-energy consumption of densification and/or to improve durability of densified biomass. Densification can be performed in a pellet mill, a briquette press, an agglomerator, a cuber, and/or an extruder. The densified biomass can be dried if necessary or desirable to a moisture level of less than about 9% by weight using energy-efficient means. For example, heat from a waste heat dryer, a grain dryer, tractor exhaust air, or any other source may be used to dry the densified biomass. Drying may be performed at a temperature of about 60° C. for about 2-3 hours. The dried densified biomass may then be cooled, stored, and/or transported as dictated by subsequent process requirements or market conditions. Other modifications may be made depending on the material inputs and on product requirements.

By moving drying to the end of the process, drying becomes optional and may be performed only when high durability, stability, and/or density are required, such as for long-distance transportation. Pelletizing or other densification (even without subsequent drying) may produce a biomass having more uniform properties, which may alleviate some handling and feeding problems, particularly when dealing with high-moisture or variable-moisture biomass feedstocks. Biomass as processed herein may be more flowable and easier to handle than raw biomass.

Many of the operations described herein are energy-intensive. By drying at the end of the process, energy added during other operations can be used to assist in the drying process. Thus, the energy required to ultimately dry the biomass—and thus the total energy—can be decreased.

Densified biomass produced as described herein may have higher yields when used to form sugars or ethanol during enzymatic hydrolysis as compared to raw biomass. For example, using densified biomass as described herein to form xylose (i.e., wood sugar) may yield at least 30% more product than conventional raw biomass, or even 40% more product than conventional raw biomass. Thus, high-moisture pelletizing is not detrimental to xylose yields from dilute-acid pretreatment for biochemical conversion relative to conventionally-ground formats.

EXAMPLES

Example 1

Conventional Pelletization Process

A conventional biomass pellet production process includes initial size reduction of biomass having at least 30% by weight moisture content to about 15-mm particle size, followed by drying to 10% moisture by weight using a rotary dryer at temperatures from 160° C. to 180° C. The dried biomass is then passed through a second-stage grinding process to reduce the particle size to less than 5 mm, typically to 2 mm. The ground biomass is steam-conditioned and pelletized. Analysis of the overall process indicates that drying is the major energy-consuming unit operation, accounting for about 70% of the total pelletization energy. The energy consumption for each unit operation and for the overall process are shown in Table 1. Grinding, drying, and pelletization data for this example are derived from laboratory-scale pellet-mill tests.

TABLE 1

Energy usage for the Conventional Pelletization Process

| Unit Operation | Energy usage (kW · hr/ton) |
| --- | --- |
| Stage 1 Grinding | 94 |
| Drying (rotary dryer at 160° C.-180° C.) from 30% to 10% moisture content | 487 |
| Stage 2 Grinding | 43 |
| Pelleting (including steam conditioning) | 75 |
| Total | 699 |

Example 2

High-Moisture Pelletization Process

A biomass pellet production process includes initial size reduction of biomass having at least 30% by weight moisture content to about 15-mm particle size, followed by a second-stage grinding process to reduce the particle size to less than 5 mm, typically to 2 mm. The ground biomass is preheated and pelletized, after which the biomass pellets have a moisture content between 20% and 25% by weight. The pellets are dried in a grain dryer to about 9% moisture by weight. Analysis of the overall process indicates that high-moisture pelletization can save approximately 32% of the energy required to produce dried pellets. The energy consumption for each unit operation and for the overall process are shown in Table 2. Grinding, drying, and pelletization data for this example are derived from laboratory-scale pellet-mill tests, and grain-drying data are derived from industry literature.

TABLE 2

Energy usage for the High-Moisture Pelletization Process

| Unit Operation | Energy usage (kW · hr/ton) |
| --- | --- |
| Stage 1 Grinding | 94 |
| Stage 2 Grinding | 107 |
| Pelleting (including preheating) | 125 |
| Drying (grain dryer at 60° C.-100° C.) to 9% moisture content | 150 |
| Total | 476 |

The effects of process variables on pellets are described in J. S. Tumuluru, "*Effect of process variables on the density and durability of the pellets made from high moisture corn stover*," BIOSYSTEMS ENGINEERING 119, pp. 44-57 (2014); and A. N. Hoover et al., "*Effect of pelleting process variables on physical properties and sugar yields of ammonia fiber expansion pretreated corn stover*," BIORESOURCE TECHNOLOGY 164, pp. 128-135 (2014); the entire disclosure of each of which is hereby incorporated herein by this reference.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various processes and systems.

What is claimed is:

1. A method of forming densified biomass, comprising:
   densifying a biomass feedstock to form a first densified biomass, wherein the biomass feedstock exhibits a moisture content of at least 25% by weight immediately prior to the densifying;
   drying, in a dryer, to a temperature of between about 50° C. and about 100° C., the first densified biomass to form a second densified biomass having a moisture content of less than 10% by weight; and
   exposing the second densified biomass to acid to form xylose,
   wherein the method does not comprise steam conditioning.

2. A method of forming densified biomass, comprising:
   exposing a biomass feedstock to ammonia;
   heating the biomass feedstock and maintaining a mean temperature of the biomass feedstock within a range from 70° C. to 110° C. for a time period of less than 5 minutes;
   after exposing the biomass feedstock to the ammonia and heating the biomass feedstock, densifying the biomass feedstock to form a first densified biomass, wherein the biomass feedstock exhibits a moisture content of at least 25% by weight immediately prior to the densifying; and
   drying, in a dryer, to a temperature of between about 50° C. and about 100° C., the first densified biomass to form a second densified biomass having a moisture content of less than 10% by weight.

3. A method of forming densified biomass, comprising:
   heating a biomass feedstock to a temperature within a range from 70° C. to 110° C.;
   after heating the biomass feedstock, densifying the biomass feedstock to form a first densified biomass, wherein the biomass feedstock exhibits a moisture content of at least 25% by weight immediately prior to the densifying; and drying, in a grain dryer, belt dryer, or cross-flow dryer, the first densified biomass to a temperature of between about 50° C. and about 100° C. to form a second densified biomass having a moisture content of less than 10% by weight.

4. The method of claim 3, further comprising, before heating the biomass feedstock, comminuting the biomass feedstock.

5. The method of claim 4, wherein densifying the biomass feedstock comprises pressing the comminuted biomass feedstock to form the first densified biomass, the first densified biomass comprising a plurality of pellets exhibiting a moisture content of at least 20% by weight.

6. The method of claim 5, further comprising cutting the plurality of pellets such that a pellet of the plurality of pellets exhibits an average length from one to five times an average diameter of the pellet of the plurality of pellets.

7. The method of claim 5, wherein the drying comprises heating, in the grain dryer, the belt dryer, or the cross-flow dryer, the plurality of pellets to remove water therefrom and form the second densified biomass, the second densified biomass comprising a plurality of dried pellets having the moisture content of less than 10% by weight.

8. The method of claim 5, further comprising cooling the second densified biomass.

9. The method of claim 5:
wherein drying, in the grain dryer, the belt dryer, or the cross-flow dryer, to the temperature of between about 50° and about 100° C., the first densified biomass comprises heating, in the grain dryer, the belt dryer, or the cross-flow dryer, to the temperature of between about 50° and about 100° C., the plurality of pellets to remove water therefrom and form the second densified biomass, the second densified biomass comprising a plurality of dried pellets having the moisture content of less than 10% by weight; and
further comprising cooling the plurality of dried pellets.

10. The method of claim 3, further comprising adding water or steam to the biomass feedstock to cause the biomass feedstock to exhibit the moisture content of at least 25% by weight immediately prior to the densifying.

11. The method of claim 3, wherein heating the biomass feedstock comprises heating the biomass feedstock without substantially reducing the moisture content thereof.

12. The method of claim 3, wherein heating the biomass feedstock comprises heating the biomass feedstock without causing torrefaction thereof.

13. The method of claim 3, further comprising, before heating the biomass feedstock, mixing the biomass feedstock with a binder.

14. The method of claim 3, wherein densifying the biomass feedstock comprises compressing the biomass feedstock in a die to form the first densified biomass as a plurality of pellets.

15. The method of claim 14, wherein compressing the biomass feedstock in a die comprises passing the biomass feedstock through an orifice having a maximum dimension in a range from 6 mm to 8 mm.

16. The method of claim 3, further comprising cooling the second densified biomass.

17. The method of claim 3, wherein drying the first densified biomass comprises removing water from the first densified biomass to form the second densified biomass having a moisture content from 7.0% to 9.0% by weight.

18. The method of claim 3, wherein drying the first densified biomass to the temperature of between about 50° C. and about 100° C. comprises maintaining the first densified biomass at a temperature of at least 60° C. and up to the 100° C. for a time period from 2 hours to 3 hours.

19. The method of claim 3, wherein densifying the biomass feedstock comprises densifying an herbaceous biomass.

20. The method of claim 19, wherein densifying an herbaceous biomass comprises densifying a biomass comprising at least one material selected from the group consisting of corn stover, wheat straw, energy sorghum, miscanthus, and switch grass.

21. The method of claim 3, wherein densifying the biomass feedstock comprises densifying a woody biomass.

22. The method of claim 21, wherein densifying a woody biomass comprises densifying a biomass comprising at least one material selected from the group consisting of pine and eucalyptus.

23. The method of claim 3, wherein densifying the biomass feedstock comprises densifying municipal solid waste.

24. The method of claim 3, wherein densifying the biomass feedstock comprises densifying the biomass feedstock in a pellet mill, a briquette press, an agglomerator, or a cuber.

25. The method of claim 3, wherein drying the first densified biomass to form the second densified biomass comprises forming the second densified biomass having a density in a range from 400 kg/m$^3$ to 650 kg/m$^3$.

26. The method of claim 3:
further comprising, prior to the heating, comminuting the biomass feedstock having the moisture content of at least 25% by weight;
wherein the densifying comprises pressing the biomass feedstock to form a plurality of pellets of the first densified biomass;
wherein the drying comprises heating the plurality of pellets of the first densified biomass to remove water therefrom and form a plurality of dried pellets of the second densified biomass having the moisture content of less than 10% by weight; and
further comprising cooling the plurality of dried pellets of the second densified biomass.

27. The method of claim 26, further comprising cutting the plurality of dried pellets of the second densified biomass such that a pellet of the plurality of dried pellets of the second densified biomass exhibits an average length from one to five times an average diameter of the pellet of the plurality of dried pellets of the second densified biomass.

28. The method of claim 3, further comprising adding water to the biomass feedstock to cause the biomass feedstock to exhibit a moisture content of at least 30% by weight before the densifying, wherein the densifying comprises pressing.

29. The method of claim 3, wherein densifying the biomass feedstock comprises densifying a previously undried biomass feedstock.

30. The method of claim 3, wherein densifying the biomass feedstock comprises subjecting the biomass feedstock to a pressure from about 10 MPa to about 600 MPa to compress and compact the biomass feedstock to form the first densified biomass.

* * * * *